United States Patent
Reiman

(10) Patent No.: US 10,310,642 B2
(45) Date of Patent: Jun. 4, 2019

(54) SAPPHIRE COVER WITH INCREASED SURVIVABILITY

(71) Applicant: CORNING INCORPORATED, Corning, NY (US)

(72) Inventor: Kevin Barry Reiman, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 307 days.

(21) Appl. No.: 15/192,725

(22) Filed: Jun. 24, 2016

(65) Prior Publication Data

US 2016/0378143 A1    Dec. 29, 2016

Related U.S. Application Data

(60) Provisional application No. 62/184,940, filed on Jun. 26, 2015.

(51) Int. Cl.
*G06F 3/039*    (2013.01)

(52) U.S. Cl.
CPC .................................... *G06F 3/039* (2013.01)

(58) Field of Classification Search
None
See application file for complete search history.

(56) References Cited

U.S. PATENT DOCUMENTS

| | | | |
|---|---|---|---|
| 8,695,476 B2 | 4/2014 | Kucherov et al. | |
| 2007/0068376 A1* | 3/2007 | Jones | B32B 17/10009 89/36.02 |
| 2011/0023697 A1 | 2/2011 | Howland | |
| 2014/0090864 A1* | 4/2014 | Paulson | C03C 17/225 174/50 |

* cited by examiner

*Primary Examiner* — Robert T Butcher
(74) *Attorney, Agent, or Firm* — Kevin M. Johnson

(57) ABSTRACT

A sapphire article having improved survivability when subjected to impact or a drop event. The article includes a continuous planar array of sapphire segments, which reduces the bending stress experienced by each individual segment. The sapphire article may serve as a cover material for displays in mobile electronic devices.

22 Claims, 6 Drawing Sheets

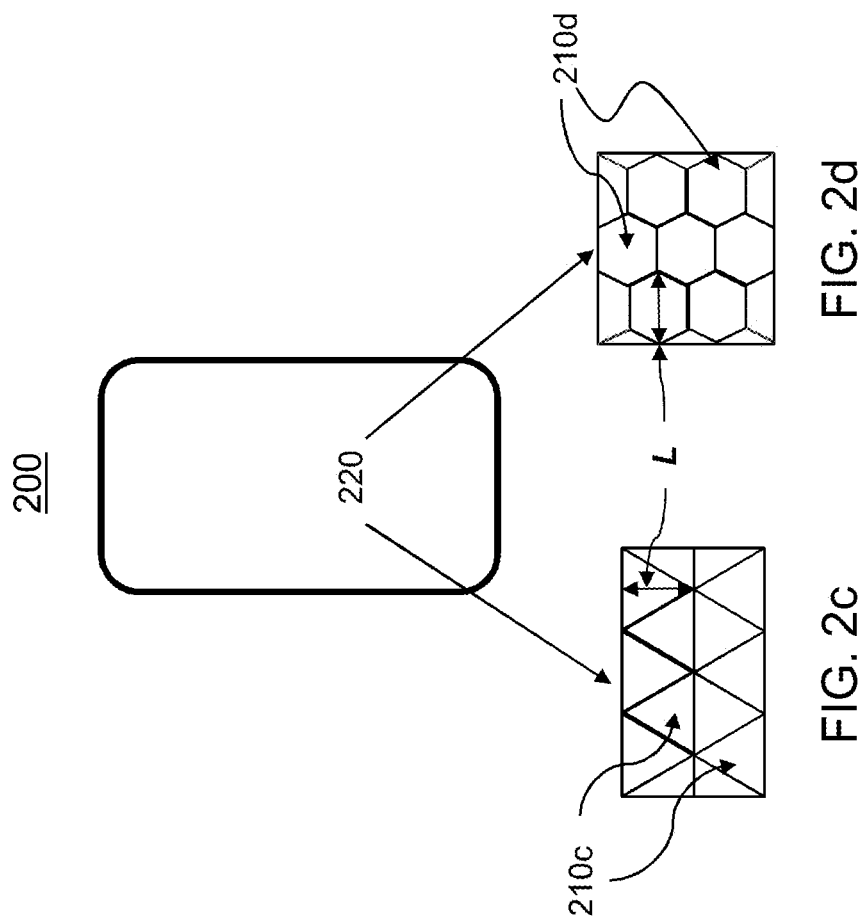

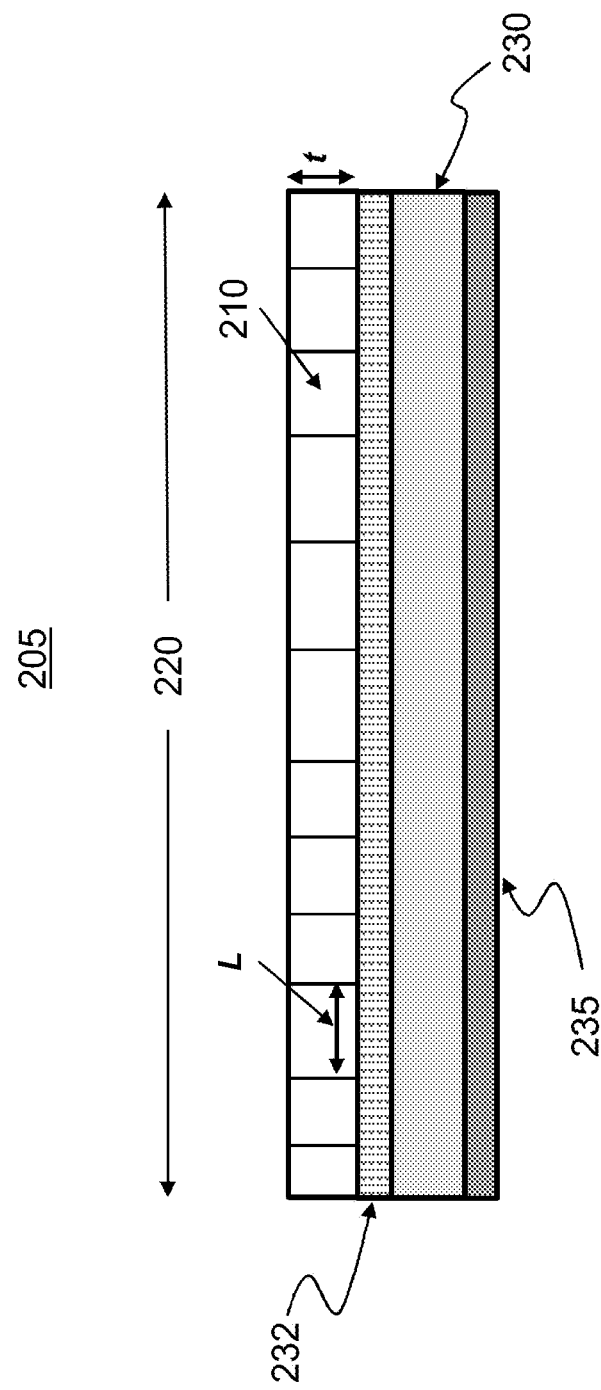

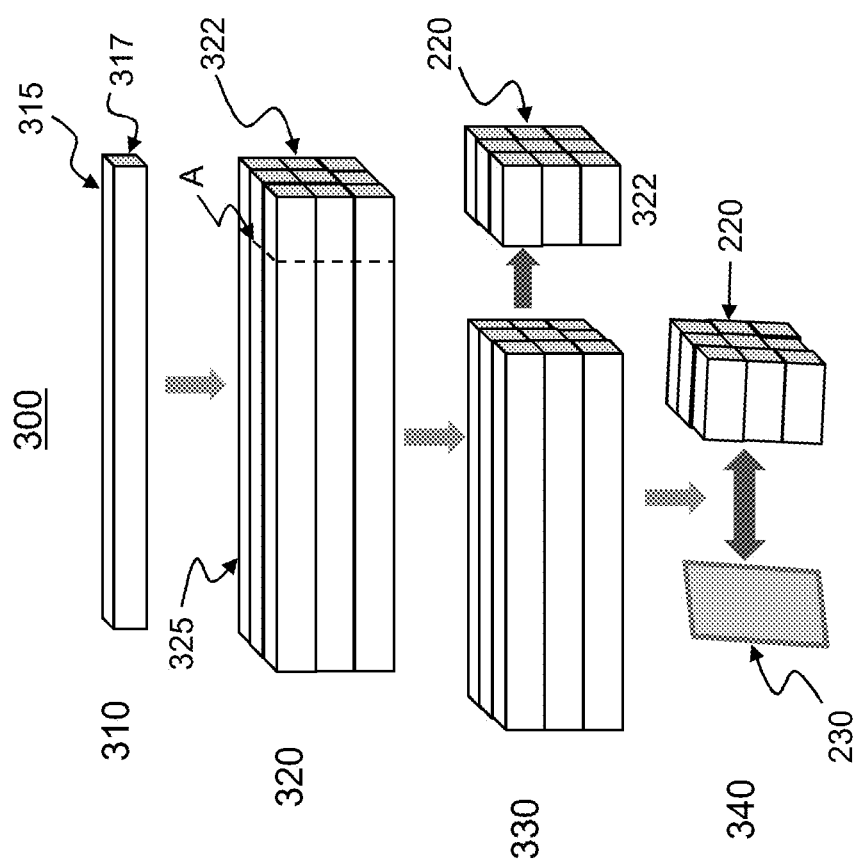

SAPPHIRE COVER WITH INCREASED SURVIVABILITY

This application claims the benefit of priority under 35 U.S.C. § 119 of U.S. Provisional Application Ser. No. 62/184,940 filed on Jun. 26, 2015 the content of which is relied upon and incorporated herein by reference in its entirety.

BACKGROUND

The disclosure relates to cover materials for displays in mobile electronic devices. More particularly, the disclosure relates to the use of sapphire as the cover material. Even more particularly, the disclosure relates to a continuous array of sapphire segments that may be used as such a cover material.

Due to its high level of scratch resistance, sapphire is currently being considered as a candidate material for cover plates for mobile electronic devices. Current cover plates typically comprise a single thin (<1 mm) piece of material. The manufacture of sapphire of this thickness has been problematic; as such cover plates have proven to be highly susceptible to failure caused by drop events.

SUMMARY

The present disclosure provides a sapphire article having improved survivability when subjected to impact or a drop event. The article includes a continuous planar array of sapphire segments, which reduces the bending stress experienced by each individual segment. The sapphire article may serve as a cover material for displays in mobile electronic devices.

Accordingly, one aspect of the disclosure is to provide a sapphire article comprising a plurality of sapphire segments. Each of the sapphire segments is transparent and has a length-to-thickness aspect ratio of at least about 15. The sapphire segments abut each other to form a continuous array having a planar surface.

A second aspect of the disclosure is to provide a transparent cover plate. The transparent cover plate comprises a transparent substrate and a plurality of sapphire segments disposed on the substrate. Each of the sapphire segments is transparent and has a length-to-thickness aspect ratio of at least about 15. The sapphire segments abut each other to form a continuous array having a planar surface. The transparent substrate has a refractive index that is within 5% of the refractive index of the plurality of sapphire segments.

A third aspect of the disclosure is to provide a method of making a planar array of sapphire segments having a predetermined thickness. The array of sapphire segments has a continuous planar face. The method comprises: forming a mother block comprising a plurality of sapphire dowels bonded lengthwise to each other and having a continuous planar face; and forming the planar array by separating a portion of the mother block from the mother block in a direction perpendicular to the lengthwise direction of the sapphire dowels. The separated portion of the mother block has a thickness that is up to 10% greater than the predetermined thickness of the sapphire array. The planar array has a length-to-thickness aspect ratio of at least about 15.

These and other aspects, advantages, and salient features will become apparent from the following detailed description, the accompanying drawings, and the appended claims.

BRIEF DESCRIPTION OF THE DRAWINGS

FIG. 2c is a schematic top view of a third embodiment of a sapphire cover plate comprising multiple pieces of sapphire;

FIG. 2d is a schematic top view of a fourth embodiment of a sapphire cover plate comprising multiple pieces of sapphire;

FIG. 3 is a schematic cross-sectional view of sapphire article disposed on a substrate; and FIG. 4 is a schematic representation of a method of making a planar array of sapphire segments.

DETAILED DESCRIPTION

Figure 1B:
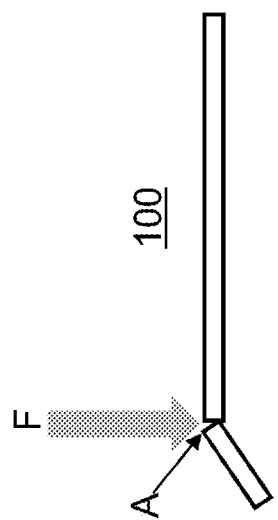
FIG. 1b is a schematic side view of the sapphire cover plate of FIG. 1 when fractured by a blunt force F.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As described herein, the term "aspect ratio" refers to the ratio of the largest surface dimension L of an article (e.g., a piece of sapphire) to the thickness t of the article.

Figure 1A:
FIG. 1a is a schematic top view of a sapphire cover plate consisting of a single sheet of sapphire.

Single pieces of materials such as glass and sapphire are currently used in applications that include cover plates or windows for electronic displays. A top view of a sapphire cover plate 100 is schematically shown in FIG. 1a. Sapphire (i.e., $\alpha\text{-}Al_2O_3$) in particular is subject to extreme bending stresses and failure when dropped on a hard surface or impacted with an object. A side view of a sapphire cover plate 100 is schematically shown in FIG. 1b. When struck with a blunt force F, sapphire cover plate 100 experiences a bending stress and fractures at point A.

Described herein is a sapphire article that may be used as a cover plate for an electronic display, or as part of a touch sensor, capacitive touch module, or the like. The sapphire article comprises a plurality of individual transparent sapphire segments having an aspect ratio (i.e., length (L)/thickness(t)) of about 15 or greater. The plurality of sapphire segments forms a continuous planar array in which adjacent sapphire segments abut each other.

Figure 2B:
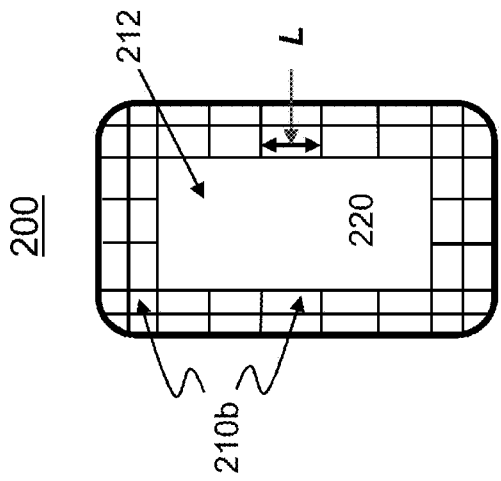
FIG. 2b is a schematic top view of a second embodiment of a sapphire cover plate comprising multiple pieces of sapphire.
Figure 2A:
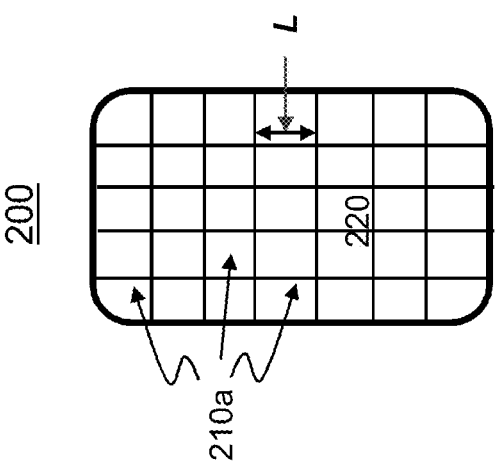
FIG. 2a is a schematic top view of one embodiment of a sapphire cover plate comprising multiple pieces of sapphire.

Top views of various embodiments of a sapphire article 200 are schematically shown in FIGS. 2a-f. FIG. 2a shows a planar array 220 comprising 35 individual quadrangular sapphire segments 210a (with the corner segments having a rounded corner) of approximately equal size, having a length L and thickness t. Individual sapphire segments 210a form a continuous planar array 220. In some embodiments, the thickness t of an individual sapphire segment 210a-d, 212 is in a range from about 0.3 mm up to about 1.0 mm and, in other embodiments, from about 0.3 mm up to about 0.8 mm, and, in still other embodiments, up to about 0.7 mm.

In FIG. 2b, a plurality of smaller sapphire segments 210b are situated around the periphery of a single, larger sapphire segment 212 to form the continuous planar array 220. As with the sapphire segments 210a shown in FIG. 2a, smaller sapphire segments 210b each have an aspect ratio of about 15 or greater. Larger sapphire segment 212 may, in some embodiments, have an aspect ratio that is different from that of smaller sapphire segments 210b. For the sake of optical clarity of the sapphire article (particularly when used as a cover glass for a consumer electronic display), however, larger sapphire segment 212 may have an aspect ratio that is within 10% of—or equal to—the average aspect ratio of the plurality of smaller sapphire segments 210b. In the configuration shown in FIG. 2b, bending stresses caused by blunt impact at or near the edge of the article are distributed over the smaller sapphire segments 210b, thereby enhancing the survivability of the sapphire article, while the larger sapphire segment 212 provides an uninterrupted, clear view of any display that may underlie the sapphire article 200.

Whereas the continuous planar arrays 220 shown in FIGS. 2a and 2b include only quadrangular sapphire segments 210a, 210b, 212, the continuous planar array 220 may include sapphire segments having other geometric shapes, such as triangular segments 210c (FIG. 2c), hexagonal segments 210d (FIG. 2d), or the like. In addition, any combination of such geometrical shapes may be used to construct the continuous planar array 220.

Continuous planar array 220 may comprise a larger or smaller number of individual sapphire segments 210a-d, 212 than what is shown in FIGS. 2a-f. For example, typical covers for mobile electronic cell phones may vary by design, but are approximately 100 mm long, 50 mm wide, and 1 mm thick. Such a cover may, in some embodiments, comprise 100 individual 7 mm×7 mm×1 mm thick sapphire segments.

In some embodiments, the adjacent sapphire segments 210a-d, 212 are bonded to each other to form the continuous planar array 220. In particular embodiments, segment-to-segment bonding is achieved by providing a bonding agent or adhesive to the interface between adjacent segments. The bonding agent may be an engineered material that helps promote bending without concentrating stress within the sapphire segments. Such bonding agents include, but are not limited to, low modulus, highly compliant epoxy or the like. In order to provide a clear view of the underlying display, the bonding agent should have a refractive index that is within 5% of the refractive index of the sapphire segments (the refractive index of sapphire is approximately 6.7). In other embodiments, however, adjacent sapphire segments 210a-d, 212 are tightly fitted together without adhesive to form the continuous planar array 220. In those embodiments where a bonding agent is not present at the interface between adjacent sapphire segments, a material that closely (i.e., within 5% of the refractive index of the sapphire segments) may be used to fill any gap between adjacent segments.

In other embodiments, the sapphire article further includes a substrate, a cross-sectional view of which is schematically shown in FIG. 3. In some embodiments, the substrate 230 is a transparent material such as, for example, a glass (e.g., soda lime glass), a polycarbonate, or the like. In these instances, substrate 230 has a refractive index that is within 5% of the refractive index of the sapphire segments 210 comprising the continuous planar array 220. The substrate has a thickness that is in a range from about 0.3 mm up to about 0.7 mm and, in other embodiments, from about 0.3 mm up to about 0.5 mm.

The sapphire article 205 may further include an adhesive or bonding layer 232 disposed between the individual sapphire segments 210 and the substrate 230 to secure the individual sapphire segments 210 and maintain their relative position in the continuous planar array 220. The adhesive or bonding layer 232 may comprise those adhesive bonding agents described hereinabove or alternate materials and has a refractive index that is within 5% of the refractive index of the sapphire segments 210 comprising the continuous planar array 220. In addition to being bonded to the substrate 230, the individual sapphire segments 210 may be bonded to each other at the interface between adjacent sapphire segments 210, as previously described hereinabove.

In some embodiments, the sapphire article 205 may further include a conductive layer 235 disposed on the surface of the substrate 230 opposite the adhesive or bonding layer 232 and sapphire segments 210 to form a touch sensor or capacitive touch module. The conductive layer 235 may comprise those conductive materials that are known in the art, such as indium tin oxide (ITO) or the like, which may be deposited on the substrate by physical vapor deposition (e.g., sputtering or evaporative means). In some embodiments, the sapphire article 205 has a thickness of up to about 1.2 mm or, in other embodiments, up to about 1.0 mm, or, in still other embodiments, up to about 0.8 mm.

When used as a cover material for mobile electronic devices, sapphire has been found to have fracture systems that are initiated and propagated by stress concentration via bending stresses. When a single sheet of sapphire is used as a cover plate, the bend stresses are concentrated at a single point (A in FIG. 1a), causing the cover plate to break.

Figure 2F:
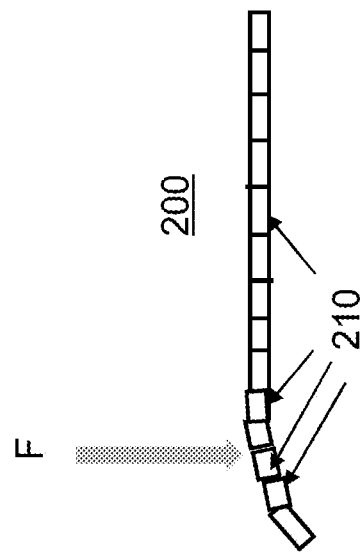
FIG. 2f is a schematic cross-sectional view of a sapphire cover plate comprising multiple pieces of sapphire when fractured by a blunt force F.
Figure 2E:
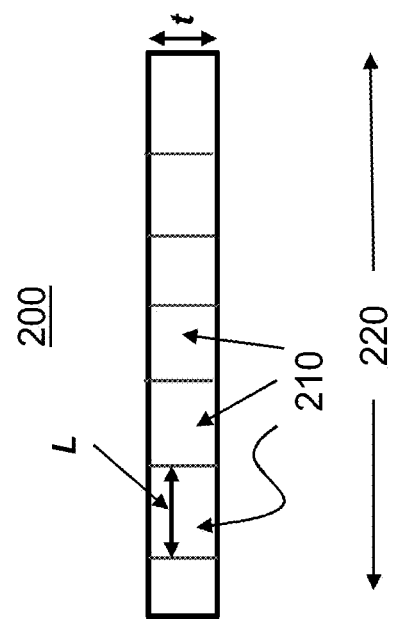
FIG. 2e is a schematic cross-sectional view of a sapphire cover plate comprising multiple pieces of sapphire.

By reducing the magnitude of concentrated bend stresses, the sapphire articles described herein have improved survivability when used as a cover material in drop events and under real world field conditions. This is achieved by reducing the localized stress concentration, combining multiple pieces of sapphire to create a cover material, and controlling the aspect ratio of the individual sapphire segments. FIG. 2f is a schematic cross-sectional view of a sapphire article 200 when subjected to a bending stress/force F. By adjusting the aspect ratio L/t (FIG. 2e) of the individual sapphire segments 210, the bending stress is distributed over multiple sapphire segments, thereby enhancing the survivability of the sapphire article.

Ball drop testing is widely used to evaluate the impact performance of articles such as the aforementioned cover plates. A number of testing protocols are known in the art such as, for example, ASTM F3007-13 ("Standard Test Method for Ball Drop Impact Resistance of Laminated Architectural Flat Glass"), the contents of which are incorporated herein by reference in their entirety. Such test protocols include positioning a sample such as a cover plate on a hard substrate such as granite, concrete, or the like. An abrasive surface, such as 180 grit sandpaper, is placed either above or below (i.e., between the hard substrate and the sample) and in contact with the sample. A rigid or solid ball (e.g., a 4.2 g stainless steel ball having a diameter of 10 mm) is dropped from a predetermined height onto the sample. A sample is typically deemed to have survived the test if no fracture (i.e., propagation of a crack across the entire thickness and/or entire surface of the sample when impacted by the ball) is observed by the naked eye.

When subjected to such ball drop tests from a height of 100 cm or to similar or equivalent testing, the sapphire articles described hereinabove have a survivability of at least about 80%. The survivability rate is determined to be the percentage of the sample population that survived the drop test. For example, if 8 samples out of a group of 10 did not fracture when subjected to ball drop testing from a height of 100 cm, the survivability rate of the glass would be 80% when dropped from that height.

In another aspect, a method of making the planar array of sapphire segments described herein is provided. The method is schematically represented in FIG. 4. In a first step 310 of method 300, a plurality of sapphire "dowels" 315 are provided. The sapphire dowels 217 are cut or otherwise separated from single crystal sapphire boules using those means known in the art. Likewise, the single crystal sapphire boules are made using those means known in the art. Each sapphire dowel 315 has a length and a face 317 corresponding to a portion of the face of the continuous planar array 220 that forms the planar surface of the sapphire article 200, 205. In the example shown in FIG. 4, the face 317 of the sapphire dowel 315 is square. It is possible, however, that the face 317 of sapphire dowels 315 may have other geometric shapes or combinations of such shapes, so long as such shapes are combined to produce an array that in continuous and uninterrupted. The length of the individual sapphire dowels 315 is greater than or equal to the thickness t of the array 220. When the length is greater than the thickness of the continuous planar array 220, a single sapphire dowel can be used to form multiple sapphire arrays.

In the second step 320 of method 300, a plurality of sapphire dowels 315 is oriented parallel to each other and bonded together to form a "mother" block 325. For the sake of clarity of description, the mother block 325 in FIG. 4 includes only nine sapphire dowels. However, it will be appreciated by those skilled in the art that the mother block 325 may in practice include many more sapphire dowels (e.g., at least 100), depending on the desired size of the array needed to form the sapphire article 200. The sapphire dowels 217 may be bonded together using engineered materials that help promote bending without concentrating stress within the sapphire. Such materials may include but are not limited to low modulus/highly compliant epoxy and have an index of refraction that closely matches (i.e., within 5%) that of the sapphire.

In step 330, a portion 322 of mother block 325 is separated along line A, which is approximately equal to or slightly greater than (i.e., up to 10% greater than) the thickness t of the array 220 of sapphire segments, to form the array 220 in which the aspect ratio (length/thickness) of each of the sapphire segments is at least about 15. Separation may be accomplished using those means known in the art such as cutting or laser separation. Following separation of the array 220 from the mother block 325, the faces of the array 220 may be ground and/or polished in order to achieve the desired degree of optical clarity.

In those embodiments in which the array 220 is bonded or otherwise joined to a substrate (230 in FIG. 3) having a refractive index that is within 5% of the refractive index of the plurality of sapphire segments, the method 300 may further include depositing an adhesive layer or bonding agent (not shown) (232 in FIG. 3) on the substrate 230 and/or array 220 to bond or join the array 220 and substrate 230. Such adhesives and bonding agents including those engineered materials previously prescribed hereinabove and have a refractive index that is within 5% of the refractive index of the plurality of sapphire segments.

The method 300 may further include depositing a conductive film or layer (235 in FIG. 3) such as indium tin oxide or the like on a surface of the substrate 230 using those methods known in the art.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A sapphire article comprising a plurality of sapphire segments, each of the sapphire segments being transparent and having an aspect ratio of at least about 15, wherein the plurality of sapphire segments abut each other to form a continuous array having a planar surface, the plurality of sapphire segments each have a largest surface dimension that is less than a largest surface dimension of the sapphire article, and the planar surface is a major surface of the sapphire article.

2. The sapphire article of claim 1, wherein adjacent sapphire segments are bonded to each other.

3. The sapphire article of claim 2, further including a bonding agent disposed between the adjacent sapphire segments, wherein the bonding agent has a refractive index that is within 5% of a refractive index of the plurality of sapphire segments.

4. The sapphire article of claim 3, wherein the bonding agent is an epoxy.

5. The sapphire article of claim 1, further comprising a transparent substrate having a refractive index that is within 5% of a refractive index of the plurality of sapphire segments, wherein the array is disposed on the transparent substrate.

6. The sapphire article of claim 5, wherein the plurality of sapphire segments are joined to the transparent substrate.

7. The sapphire article of claim 6, wherein the plurality of sapphire segments are joined to the substrate by an adhesive layer disposed between the transparent substrate and the plurality of sapphire segments, the adhesive layer having a refractive index that is within 5% of a refractive index of the plurality of sapphire segments.

8. The sapphire article of claim 5, wherein the transparent substrate comprises a conductive layer.

9. The sapphire article of claim 8, wherein the sapphire article and the transparent substrate form a portion of a touch sensor or a capacitive touch module.

10. The sapphire article of claim 1, wherein the sapphire article is a cover plate for an electronic display.

11. The sapphire article of claim 1, wherein the sapphire article has an 80% probability of survival when subjected to a drop test from a height of 100 cm.

12. A transparent cover plate, the transparent cover plate comprising:
   a. a transparent substrate; and
   b. a plurality of sapphire segments disposed on the substrate, each of the sapphire segments being transparent and having an aspect ratio of at least about 15, wherein the plurality of sapphire segments abut each other to form a continuous array having a planar surface, the plurality of sapphire segments each have a largest surface dimension that is less than a largest surface dimension of the transparent cover plate, and the planar surface is a major surface of the transparent cover plate, and wherein the transparent substrate has a refractive index that is within 5% of a refractive index of the plurality of sapphire segments.

13. The transparent cover plate of claim 12, wherein the plurality of sapphire segments is joined to the transparent substrate.

14. The transparent cover plate of claim 13, wherein the plurality of sapphire segments is joined to the substrate by an adhesive layer disposed between the transparent substrate and the plurality of sapphire segments, the adhesive layer having a refractive index that is within 5% of a refractive index of the plurality of sapphire segments.

15. The transparent cover plate of claim 12, wherein the transparent substrate comprises a conductive layer.

16. The transparent cover plate of claim 15, wherein the sapphire article and the transparent substrate form a portion of a touch sensor or a capacitive touch module.

17. A method of making the sapphire article of claim 1, comprising a planar array of sapphire segments, the planar array having a predetermined thickness and each of the sapphire segments having a continuous planar face, the method comprising:
   a. forming a mother block, the mother block comprising a plurality of sapphire dowels bonded lengthwise to each other, the mother block having a continuous planar face; and
   b. separating a portion of the mother block from the mother block in a direction perpendicular to the lengthwise direction of the sapphire dowels to form the planar array, wherein the planar array has a length-to-thickness aspect ratio of at least about 15, and wherein the portion of the mother block has a thickness that is up to 10% greater than the predetermined thickness.

18. The method of claim 17, further comprising joining a substrate to the planar array.

19. The method of claim 18, wherein the substrate has a refractive index that is within 5% of the refractive index of the sapphire segments in the planar array.

20. The method of claim 18, wherein joining the substrate to the planar array comprises providing an adhesive between the substrate and the planar array.

21. The method of claim 20, wherein each of the substrate and the adhesive has a refractive index that is within 5% of the refractive index of the sapphire segments in the planar array.

22. The method of claim 18, further comprising depositing a conductive material on a surface of the substrate.

* * * * *